United States Patent [19]

Eknayan

[11] 4,065,919
[45] Jan. 3, 1978

[54] POLLUTION MINIMIZING DEVICE AND METHOD FOR INTERNAL COMBUSTION ENGINES

[76] Inventor: Hrant Eknayan, 7528 Columbia, Rosemead, Calif. 91770

[21] Appl. No.: 541,894

[22] Filed: Jan. 17, 1975

Related U.S. Application Data

[63] Continuation-in-part of Ser. No. 382,373, July 25, 1973, Pat. No. 3,882,677.

[51] Int. Cl.² .................... F01N 3/15; F02M 25/06
[52] U.S. Cl. ................................. 60/274; 60/278; 123/119 A; 123/119 E; 423/112
[58] Field of Search ............... 60/278, 303, 299, 302, 60/274; 123/119 E, 119 A; 423/212

[56] References Cited

U.S. PATENT DOCUMENTS

| | | | |
|---|---|---|---|
| 1,793,813 | 2/1931 | MacKinnon | 60/302 |
| 1,941,487 | 1/1934 | Portail | 123/119 E |
| 2,576,450 | 11/1951 | Marval | 123/119 E |
| 2,899,949 | 8/1959 | Hicks | 123/119 E |
| 3,211,534 | 10/1965 | Ridgway | 60/303 |
| 3,302,394 | 2/1967 | Pahnke | 60/302 |
| 3,854,288 | 12/1974 | Heitland | 60/303 |

Primary Examiner—Douglas Hart
Attorney, Agent, or Firm—D. Gordon Angus; Donald D. Mon

[57] ABSTRACT

The inlet opening of a chamber is connected to the exhaust manifold of an internal combustion engine so that the combustion products pass through the chamber to an exit opening. The chamber contains a pair of baskets which are open at their upstream ends and closed at their downstream ends. The sides of the baskets are made up of thin copper wire strands placed side by side. The exhaust from the engine is brought into the first basket and the pulses of pressure from the engine exhaust bows the wires outward in a pulsating manner to alternately open and close the spaces between the wires allowing the gases to pass through the spaces. Atmospheric air is introduced into the first basket to mix with the combustion products. The gases emanating from the first basket are introduced into the open end of the second basket and pass through the walls of the second basket in the same manner as the first basket, and then on to the exhaust opening. A feedback conduit leading from the area between the two baskets is brought to the carburetor to feed a part of the products within the chamber to the carburetor air inlet opening. Blue sparks are provided at the region of the chamber between the two baskets and also at the carburetor inlet opening. The effect of small cross-section copper wires of the baskets and the sparks is to produce chemical reactions which result in nearly eliminating from the exhaust opening from the chamber, unburned hydrocarbons, nitrogen oxides and carbon monoxide.

7 Claims, 2 Drawing Figures

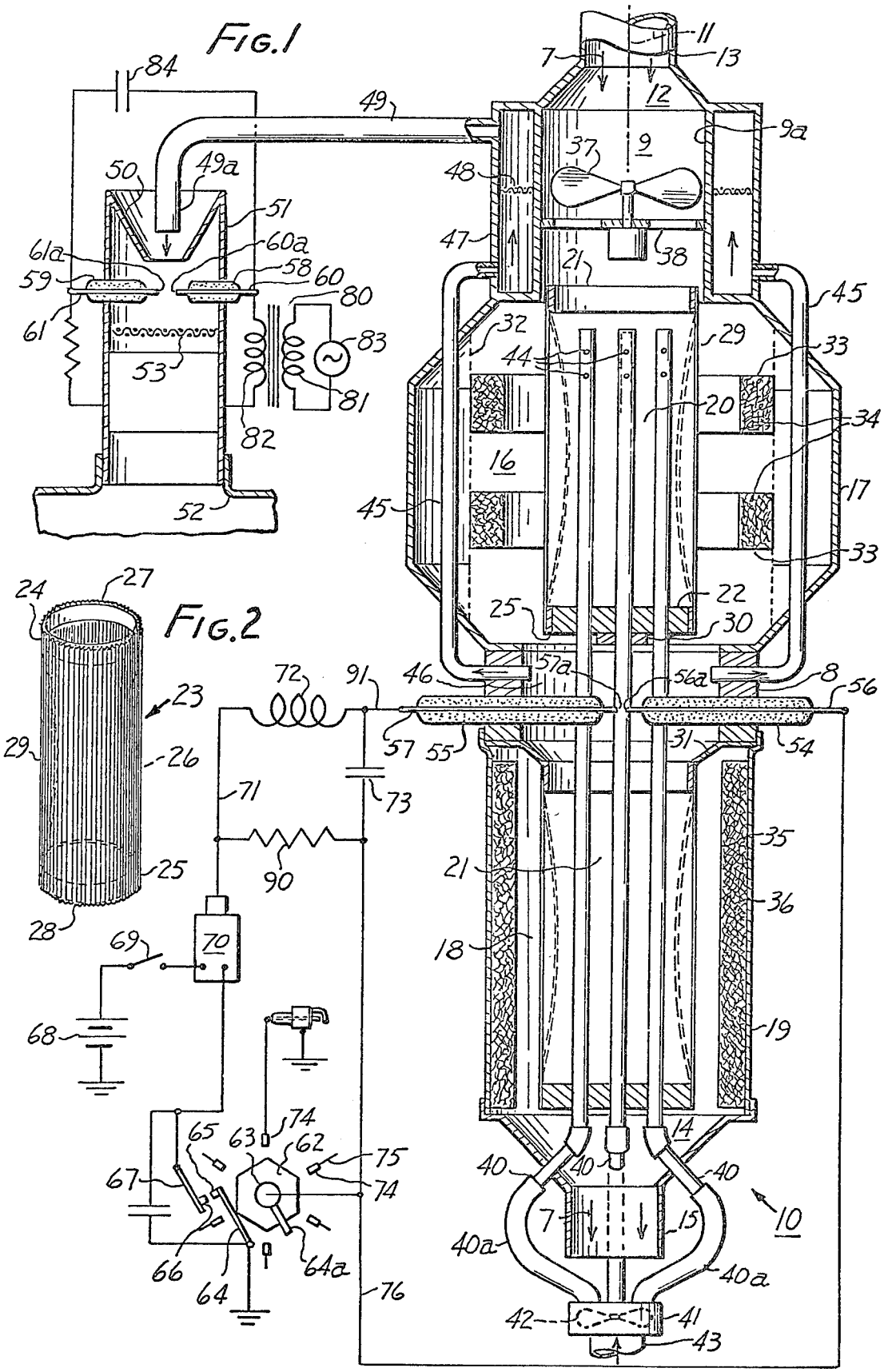

POLLUTION MINIMIZING DEVICE AND METHOD FOR INTERNAL COMBUSTION ENGINES

This is a continuation-in-part of my application Ser. No. 382,373 filed July 25,1973 entitled "Pollution Minimizing Device for Internal Combustion Engines", now U.S. Pat. No. 3,882,677.

This invention relates to pollution control devices and more particularly to such devices for reducing contaminants from the exhaust products from internal combustion engines, particularly automobile engines.

It is well-known that the combustion products exhausted from an internal combustion engine utilizing a hydrocarbon fuel such as gasoline, contain undesirable contaminants which are obnoxious or unpleasant. These include unburned hydrocarbons and hydrocarbons generated during the combustion process, carbon monoxide and oxides of nitrogen, including nitric oxide (NO) and nitrogen dioxide ($NO_2$). When sulphur is present in the fuel, sulphur dioxide is also formed. The emmission of sulphur dioxide can also be substantially avoided by use of fuels containing little or no sulphur. The minimizing of unburned hydrocarbons, carbon monoxide and nitrogen oxides is more difficult.

Various expedients have heretofore been used or proposed for minimizing these undesirable contaminants, with varying degrees of success. Many such pollutant or smog-control devices have made use of catalysts for extracting contaminants and some have made use of after-burners. All such previous devices which were reasonably effective in reducing the contaminants have required frequent servicing or periodic replacement of catalyst or have been expensive, or have required increased consumption of fuel for a given amount of work output of the engine.

It is an object of the present invention to provide a pollution reducing device of the character referred to which reduces the amount of hydrocarbon, carbon monoxide and nitrogen oxides in an engine exhaust, to a very small quantity.

Another object is to provide such a device which functions for a long period of time without servicing or replacement of parts or chemical.

A further object is to provide such a device which is relatively inexpensive and does not increase fuel consumption.

The invention is carried out by provision of a chamber through which the exhaust products from an internal combustion engine are caused to flow before being emitted to the atmosphere, the chamber containing a plurality of baskets arranged in tandem and spaced from each other. The baskets have sides formed of small or thin pieces of copper, such as thin copper wires, placed closely together so that the wall has porosity with respect to the passage of gas and can be bulged outwardly to increase the porosity or openings when the basket is subjected to pulses of pressure. Each basket is open at its upstream end and closed at its downstream end and provision is made for directing the exhaust products into the upstream ends of the tandem arranged baskets so that these gaseous products are forced out through the porous sides of the basket to continue enroute to the exhaust end of the chamber.

Spark gap means is provided within the chamber between two baskets, to which high-voltage generating means is applied of a nature to create a blue spark across the gap. Atmospheric air is introduced into one of the baskets to mingle with the combustion products entering it from the engine. The presence of this hot air and the fine copper wires and the blue sparks at the gap produce or augment chemical reaction which result in the nearly complete elimination on unburned hydrocarbons, carbon monoxide and nitrogen oxides from the products exhausted from the device.

A preferred feature resides in the use of a fan blade at the entrance to the device for mixing the engine combustion products with the atmospheric air which is introduced.

Another preferred feature resides in the use of sodium chloride, ordinarily rock salt, within the casing of the chamber to reflect heat generated by the reactions back toward the center of the chamber and reduce conduction or radiation of heat to the exterior of the chamber.

Another desirable feature resides in the provision of conduit means for conveying some of the gaseous products within the chamber to the air inlet entrance of the carburetor of the engine and the provision of means creating a blue spark at that entrance where the output from the feedback conduit mixes with atmospheric air introduced into the carburetor input.

Other features reside in the provision of elements of finely divided copper, such as copper mesh, in the chamber.

The foregoing and other features of the invention will be better understood from the following detailed description and the accompanying drawing, of which:

FIG. 1 shows in cross-section a pollution-minimizing system according to this invention; and FIG. 2 is a perspective view of a basket used in the system of FIG. 1.

The pollution control device shown in FIG. 1 comprises a generally cylindrical chamber 10 having a longitudinal axis 11, with a mouth section 9 at the upstream end having an inlet opening 12 connected to a pipe 13 leading from the exhaust manifold (not shown) of an internal combustion engine, for example a 6-cylinder automobile engine. The opposite end 14 of the chamber has an opening connected to an exhaust pipe 15 which opens to the atmosphere to exhaust combustion products from the engine entering the chamber at inlet opening 12 and leaving it at exit opening 14. The chamber comprises an upstream section 16 contained within a peripheral wall 17 of the chamber and a second section 18 downstream from section 16, contained by a peripheral chamber wall 19 of somewhat smaller diameter than wall 17. Between sections 16 and 18 is a cylindrical ring section 8. Thus, the sections 16, 8 and 18 are arranged in tandem along the longitudinal axis 11 between the inlet 12 and exit 14 of the chamber, and combustion products from the engine flow in the direction of arrows 7.

Chamber section 16 contains a cylindrical basket 20 coaxial with the longitudinal axis 11, with its end 21 open and facing mouth 9, the opposite end of the basket being closed by a closure 22. The basket is built on a frame 23 shown in FIG. 2, which comprises a pair of circular end members 24 and 25 joined by three longitudinally extending inwardly bowed side struts 26 spaced 120 degrees apart. The rims of circular members 24 and 25 which face upstream and downstream respectively from the basket are provided with serrations 27 and 28, respectively, within which a copper wire 29 (FIG. 3) is strung back and forth from one circular end to the other, so that the sides of the basket are comprised of a multitude of stretches of the copper wire extending parallel to each other and longitudinally from end to end of the basket. It would be possible however for at least some of the stretches to cross each other. The wire diameter is relatively very small, for example, about .008 to .012 inch. When the basket is at rest, adjacent strands of the copper wire are in contact, or substantial contact, so that there is formed a cylinder whose side consists of the wire strands. End 22 of the basket is closed and end 21 is open and facing the incoming exhaust from the engine. All gases entering mouth 9 flow into the open end of the basket and leave the basket between the copper wire strands.

A second basket 21 similar to basket 23 is co-axially located within chamber section 18 and secured to ring section 8 by a flange 31, the basket 21 being open at its upstream end and closed at its downstream end so that all gases passing through ring section 8 enter the open end of the basket 21 and pass out of the basket between the copper wire strands. A cylinder of copper mesh 32 is fitted in the shell 17 and concentrically located between basket 20 and the peripheral wall 17.

There are preferably attached to the inner wall of cylinder 32, spaced doughnut-shaped containers 33 of copper mesh, of which two are shown, containing sodium chloride 34, ordinarily rock salt. A copper mesh cylinder 35 containing sodium chloride or rock salt 36 is also attached to the peripheral wall 19.

A fan 37 is mounted for free rotation about an axis colinear with the longitudinal axis 11, on a spider 38 attached to the inside of the cylindrical wall 9a of the mouth 9. The fan is rotated by flow of gases represented by arrows 7, through mouth 9, which serves to equalize temperatures and also serves to mix the exhaust gases with incoming air as will be described hereinafter. The fan also serves to prevent spark firing disturbances occurring in ring 8, described hereinafter from reaching the engine manifold.

Tubes 40 of brass or copper are supported at the closure at the downstream end of baskets 21 and pass through, and are fixed to, the chamber wall at the downstrem end of the chamber. Flexible conduits 40a connected to the respective ends of tubes 40 outside the chamber lead into a compartment 41 which contains a fan 42, operable from a suitable electric power system (which may be the electrical system of an automobile). The tubes 40 extend through baskets 21 and 20, respectively, to a position near the entrance opening of basket 20. These tubes are plugged closed at their ends in basket 20, but are provided with a number of small openings 44, for example one-thirty second inch, near their ends. The fan 42 blows atmospheric air from an air entrance pipe 43 to the holes 44 where it enters basket 20, mixing with the incoming combustion products from the engine. The freely rotatable fan aids this mixing.

The upstream basket 20 is positioned by the three tubes 40 passing snugly through the closure 22 of the basket, and to prevent basket 20 from slipping downstream a stopper 30 is fixed to one of the pipes 40 so that the closure 22 cannot slip past the stopper. The upstream open end of basket 20 is free to move in the longitudinal direction relative to cylindrical wall 9a of mount 9, but with little or no space from wall 9a. Thus, as the material of the basket becomes heated from the exhaust gases from the engine the struts 26 expand in length, as do the copper wire stretches 29, so that the upstream end of basket 20 can slide upstream. This expansion of the struts 26 serves to keep the copper wire stretches 29 taut to avoid sagging as the copper wires themselves expand.

Conduits 45 leading from region 46 at ring 8 between the two baskets 20 and 21, lead into a manifold 47 which surrounds the wall 9a of mouth 9 so that gaseous products present in region 46 are brought into this manifold. A screen 48, preferably of copper mesh, is fixed across a central part of this manifold so that gases can pass through it to the upper part of the manifold while preventing the passage of solid particles. From the upper part of the manifold a copper tube 49 leads to a concial-shaped entrance mouth 50 of a cylindrical entrance conduit 51 leading into the mouth 52 of the carburetor of the engine. The exit 49a is spaced from the walls of the mouth 50 so that atmospheric air as well as gases present in conduit 49 will be drawn into the carburetor entrance cylinder 51 and hence, into the air intake 52 of the carburetor.

There are fitted through the wall of ring 8 of the device 10 a pair of elongated electrical insulators 54 and 55, such as porcelain, preferably aligned with each other and passing through opposite sides of the ring. Iron electrode rods 56 and 57 pass through bores through the respective insulators with their inner ends 56a and 57a separated from each other at the longitudinal axis 11, this separation constituting a spark gap. A satisfactory gap is about 0.032 inch and the gap is preferably made adjustable from outside the chamber by adjustment of the electrodes. Similar insulators 58 and 59 pass through the wall 51 at the carburetor entrance and copper electrodes 60 and 61 pass through bores through these insulators forming a spark gap of about 0.035 to 0.045 inch between their inner ends 60a and 61a.

Voltage for producing sparks across spark gap 56a, 57a and timing for the sparks are provided from the ignition system of the engine which fires the hydrocarbon-air mixture in the cylinders of the engine. A pertinent part of this ignition system is illustrated in FIG. 1. It comprises a hexagonal shaped cam 62 (corresponding to a 6-cylinder engine) fixed to a shaft 63 geared to the engine speed to move a resilient arm 64 so that an electrical contacting element 65 makes contact with another contact element 66 on a fixed member 67, each time a point of the hexagonal member 62 urges the arm 64 in the direction of contact 66. This sends current from a battery 68, when ignition switch 69 is closed, through a coil of a transformer 70 and through closed contacts 65, 66, in a well-known manner. When contacts 65 and 66 open again as the cam member continues to rotate, the breaking of the circuit creates a high voltage pulse at conductor 71 at the transformer output. This high voltage pulse passing through resistor 90 arrives at the spark plug which at that time is selected by selector 64a, and creates the spark at that plug to fire the charge in that cylinder of the engine. A series arranged inductance 72 and capacitor 73 are connected across resistor 90 and the high tension voltage developed across the capacitor is applied by conductors 91 and 76 to the electrodes 57 and 56. The inductance and capacitor have the effect of causing the sparks to occur at spark gap 56a, 57a a minute fraction of a second later than the spark at the corresponding spark plug. The capacitor functions to create a relatively powerful blue spark rather than a weaker red spark which would otherwise occur at spark gap 56a, 57a. The speed of the detonation wave generated in the engine cylinder upon the sparking at the spark plug is very fast, about 4,000 meters per second, and the spark occurring at spark gap 56a, 57a is delayed long enough so that the detonation wave has passed the ring 8 before the spark occurs at spark gap 56a, 57a. Suitable values for the electrical components in the circuitry relating to the spark plug and spark gap 56a, 57a, are:

Resistor 90 — 116K to 120K
Inductance 72 — about 1,000 to 2,000 microhenries
Capacitor 73 — about 33 to 40 mmf In this manner, contacting arm 64 applies instantaneous high voltage pulses to successive ones of contact elements 74 having conductors 75 leading to respective ones of the spark plugs to fire the respective cylinders seccessively. A minute fraction of a second after each successive cylinder is fired, the spark gap 56a, 57a is fired by a blue spark by reason of conductor 76.

When the engine is cold it may be desirable to connect a conductor around resistor 90 to short circuit this resistor for a few minutes upon starting the engine, which may be done with a switch.

Means is also provided for producing sparks at spark gap 60a, 61a at the entrance to the carburetor. This comprises a transformer 80 having a primary coil 81 and a secondary coil 82 of many more turns than the primary. A source of alternating voltage 83 which may conveniently be about 200 of more cycles per second, is connected across the primary winding resulting in a much higher voltage across the secondary winding. This is carried to condenser 84, the voltage across which is applied across the spark gap 60a, 61a causing it to spark in accordance with the frequency of source 83.

The pollution minimizing device 10 is preferably installed with its axis 11 in an inclined position. When the inlet opening 12 is connected to the pipe 13 from the exhaust manifold and the exhaust pipe positioned to exhaust to atmosphere, the turning on of the electrical system, ordinarily done at ignition switch 69, will start up the fan 42 by suitable wiring which is not shown. The exhaust gases entering mouth 9 enter basket 20. Due to the successive firings of the several cylinders of an internal combustion engine, the exhaust is emitted in pressure pulses, hence the pressure within basket 20 is subject to these pulses. At each pressure pulse the wire strands 29 tend to bulge outward from the axis 11 causing adjacent strands, which in the absence of pressure are substantially touching or almost touching each other, to move further apart, thereby facilitating the exit of the gases from within the basket to the exterior of the basket within section 16 of the device.

During all the time of these pulsations, there is a steady flow of atmospheric air into basket 20 from the exit openings 44 of the pipes 40 due to the action of fan 42 which is drawing the atmospheric air through the pipes to the basket. The gases in the basket are a mixture of the products of combustion and of the introduced air, the mixing being augmented by fan blades 37. This mixture upon passing through the wire strands of the basket meet the copper mesh screen 32 and the copper mesh containers 33 and also pass down to the central region 46 between the two baskets and on into the second basket 21. In basket 21 the action is similar to that which occurs in basket 20 excepting that no additional atmospheric air is introduced into basket 21. Under the action of the exhaust pulsations the copper wire strands 29 of basket 21 expand during the pulsations and collapse between pulsations, as in the case of basket 20, and when expended the eixt of the gases from within the basket is facilitated through the spaces between the strands so that the gases emanating from within the strands of the basket mingle with the copper mesh container 35 and continue on out through the exhaust pipe 15.

While the gases are flowing to the exhaust pipe 15 in this manner, sparks are occuring at spark gap 56a, 57a in time with the pressure pulsations, snce the timing of the sparks from the engine spark plugs which are producing the cylinder explosions are the same as those at gap 56a, 57a.

Since the region 46 between the baskets is always somewhat pressurized relative to atmospheric pressure, while the engine is running, there is a flow of the gas at region 46 through pipes 45 into manifold 47 and pipe 49 into the air intake of the carburetor, and this flow is aided by the suction at the mouth of the carburetor. This gas contains some unburned hydrocarbons which is acted upon by the sparks from gap 60a, 61a before these gases and atmospheric air enter the air intake of the carburetor.

The electrical circuitry and voltages related to spark gaps 56a, 57a and 60a, 61a are such that the sparks occurring at these gaps are blue sparks.

In the operation of an internal combustion engine utilizing a hydrocarbon fuel, usually a gasoline, the optimum condition is that of complete combustion in which all the hydrocarbon is burned to carbon dioxide and water and without other contaminants. In actual practice this optimum condition is virtually never reached, due to the fact that there is seldom, if ever, complete combustion so that carbon monoxide and residual hydrocarbons are generally present in the exhaust emission. This often includes some hydrocarbons, not present in the fuel itself, which are generated during the combustion process. Furthermore, nitrogen oxides ordinarily formed during the combustion process in the cylinders are emitted. Moreover, many hydrocarbon fuels contain at least some sulphur which results in emission of sulphur dioxide. Some of the $SO_2$ coming out of feed back pipe 49 changes to $SO_3$ and sulphur, because at the spark there are high temperature, oxygen and copper oxide as a catalyser. The carbon monoxide, nitrogen oxide, and unburned hydrocarbon problems are very largely overcome by use of a device according to the present invention.

In the operation of the pollution control device according to this invention there are a number of chemical reactions which are somewhat involved, and perhaps even somewhat obscure. It is believed that chemical reactions occur as follows: The concentration of hydrocarbons in the exhaust is substantially reduced by the heating of the air brought into pipes 40 by routing the pipes through most of the air brought into pipes 40 by routing the pipes through most of the length of the device 10 where they are surrounded by the hot gases from the engine exhaust manifold, and injecting this hot air into basket 20 where it mixes with the combustion products containing the undesired quantity of unburned hydrocarbon. This hot mixture burns to carbon dioxide and water, aided by action of the sparking at air gap 56a, 57a, hence the gaseous products passed into basket 21 are relatively free of unburned hydrocarbon.

The hot air introduced into basket 20 from the pipes 40 also serves to burn the carbon monoxide to carbon dioxide at the same time that the hydrocarbons are being burned. The nitrogen dioxide present in the exhaust from the manifold is actually of some aid in substantially eliminating carbon monoxide and hydrocarbons from the manifold exhaust because carbon monoxide and hydrocarbons burn somewhat more readily in the presence of nitrogen dioxide than in air alone. This oxidation of the carbon monoxide to carbon dioxide is further enhanced by the pressure of the copper used in the device, which has formed on its surface some molecules of an oxide of copper, thus, $$Cu_2O + CO \rightarrow 2Cu + CO_2$$
$$H_2O + CO \xrightarrow{ozone} H_2 + CO_2$$

Ozone is generated by the sparks.

The undesirable nitrogen oxide (NO) is formed in the engine cylinders as a combustion product. At the outlet of the exhaust manifold some nitrogen dioxide is formed from the nitrogen oxide because of cooling and mixing with some air. Since nitrogen dioxide ($NO_2$) is not combustible, it is desired to convert it back to nitrogen oxide (NO) which can be reduced to nitrogen and water. This conversion is accomplished by the presence of the copper of basket 20, cylinder 32 and receptacles 33, this:

$$Cu + NO_2 \xrightarrow{heated} CuO + NO \quad \text{and}$$
$$2Cu + NO_2 \xrightarrow{heated} Cu_2O + NO$$

Since some carbon will be formed in the engine during the combustion and blown out through the engine manifold to the device 10, there will also occur to some degree, the following reactions:

$$C + NO_2 \xrightarrow{heated} CO + NO$$
$$Cu_2O + CO \rightarrow 2Cu + CO_2$$

The amount of carbon entering the device 10 will not ordinarily be sufficient to eliminate the nitrogen oxide and the major part of the nitrogen oxide will be burned to water and nitrogen gas by the sparks at gaps 56a, 57a provided hydrogen and ammonia are present. The necessary hydrogen and ammonia are formed in the device because of the presence of some hydrogen due to the incomplete burning of the hydrocarbons, and both hydrogen and ammonia are formed by the blue sparks at gap 56a, 57a. Thus, $$2Cu + 3H_2 + N_2 + O_2 \rightarrow 2CuO + 2NH_3$$
$$2Fe + 6H_2O + N_2 \rightarrow 2Fe(OH)_3 + 2NH_3$$
$$2NH_3 \rightarrow N_2 + 3H_2$$

It is believed that all of the above foregoing chemical reactions take place in the operation of the device 10.

An important factor in the reduction of pollutants by use of a device according to the present invention resides in the presence of the copper wires or pieces of small cross-section. Finely divided copper or copper pieces or wires of very small size tends to form Cu ($NO_2)_2$ in a reaction generating much heat, which has a beneficial effect because the heat in the device aids the reactions described above. During their short time in the device combustion products entering it come into contact with a relatively large number of active copper molecules. Thus, the two cylinders or baskets 20 and 21 are formed of closely packed and very thin copper wires and the heat generated at each copper strand tends to be insulated from the other copper strands. Since the radius of curvature of the copper wires is very small, a relatively small amount of carbon particles from the engine exhaust manifold can adhere permanently to the copper wire to stop the important reaction of nitrogen dioxide on the copper. By this relatively small diameter copper wire a relatively large amount of copper surface per gram of copper is exposed to contact by the exhaust gases. And moreover, this large amount of copper surface provides a base for a substantial amount of a thin film of active carbon particles from the engine, even though the individual particle do not stay permanently on the wire, for the desired reaction:

$$C + NO_2 \rightarrow CO + NO$$

In the operation of the device, relatively little back pressure is being produced in it, and moreover, it is performing the funcation of a muffler action at the same time as it is reducing contaminants.

The rock salt is a good reflector of heat by reason of the interreflection action between the crystal particles, although it does not become greatly itself. Thus, its effect is to keep the inside of the device at a desired high temperature which aids the desired chemical reactions and does not readily radiate or conduct heat to and through the walls of the device.

The rock salt also performs the desired function of converting some of the $NO_2$ to NO, thus:

$$NaCl + NO_2 \rightarrow NOCl + NaNO_2$$
$$2NOCl \rightarrow 2NO + Cl_2$$

Although this last mentioned reaction is ordinarily slow, it is speeded up by the presence of carbon from the engine.

The sparks at spark gap 56a, 57a are involved in producing the following reactions:

$$4NO + 2H_2 \rightarrow 2N_2 + 2H_2O + O_2$$
$$2NO + 2NH_3 \rightarrow 2N_2 + 2H_2O + H_2$$
$$2NH_3 \rightarrow N_2 + 3H_2$$
$$C + NO_2 \rightarrow CO + NO$$
$$6NO + 4NH_3 \rightarrow 5N_2 + 6H_2O$$
$$H_2O + CO \xrightarrow{ozone} H_2 + CO_2$$
$$2NO + 2H_2 \rightarrow 2H_2O + N_2$$
$$4NH_3 + 5O_2 \rightarrow 4NO + 6H_2O$$

This sparking is also involved in the burning of carbon monoxide and hydrocarbons to carbon dioxide.

The effectiveness of the sparks in triggerng or enhancing these reactions is due in considerably degree to the ultraviolet energy of the blue sparks. Although the sparking is involved in the reactions, the life of the iron electrodes at the spark gap 56a, 57a is nevertheless relatively long, even though the frequency of the sparks is an many times greater than that at each spark plug as the number of cylinders in the engine, as the pressure at gap 56a, 57a is lower than in the engine cylinders. The relatively low power blue spark across the copper electrodes at spark gap 60a, 61a at the entrance tube to the carburetor air intake is known to be beneficial, although the specific reason for its beneficial effect is not as well understood by me as the action at spark gap 56a, 57a. It is believed that at spark gap 60a, 61a some hydrogen and ammonia will form there due to the presence of copper, copper oxide vapor between these sparking electrodes and considerable water vapor from the feedback conduit 49 and nitrogen in the air, attended by heating of the atmospheric air entering the mouth 50 around the exit 49a of pipe 49 which is carrying gaseous products from region 46 of the device 10. It is also thought possible that undesirable nitrogen oxides lurking under the hood in the case of an automobile engine may be eliminated or reduced in entering the carburetor. Regardless of the underlying reasons it has been found that the use of the feedback conduit 49 and the blue sparks at gap 60a, 61a adds to the reduction of undesired contaminants.

A further advantage of the feedback conduit 49 is that such hydrocarbons as may still be present at region 46 of device 10 are carried back in considerable part to enter the carburetor where they do useful work in the engine, thereby increasing the efficiency of the engine relative to the fule consumed.

Regardless of whether all the chemical reactions occur precisely as indicated above, it is a fact that use of a device according to this invention has reduced the quantity of nitrogen oxides, carbon monoxide and unburned hydrocarbons a great many times as compared with emissions from an engine which does not have this control device.

It is possible to make many modifications of the equipment within the scope of the invention. For example, the baskets need not be cylindrical, but may be some other tubular or polygonal form. Furthermore, the copper wire stretches of the baskets need not extend in the longitudinal direction, but may be arranged in some other way, such as circumferential or spiral, or some form of copper mesh may be used instead of the copper wire to provide the porosity or openings through the basket walls for permitting exit of the gases therein.

It will also be understood that the electrical circuitry for producing the intermittent sparks at the spark gaps may be modified from that shown and described.

It will be understood that the embodiments of the invention illustrated and described herein are given by way of illustration and not of limitation, and that modifications or equivalents or alternatives within the scope of the invention may suggest themselves to those skilled in the art.

What is claimed is:

1. A pollution control device for reducing the quantity of pollutant mixed with the gaseous products of combustion of hydrocarbon fuel in an internal combustion engine, comprising:
    a chamber having an inlet for entry of the combustion products into the chamber and an outlet for exhaust of gases from the chamber so that gases flow through the chamber from the inlet to the outlet;
    a plurality of baskets arranged in tandem and spaced from each other, each basket being open at its upstream end and closed at its downstream end;
    each basket having a side wall comprising copper which provides openings for passage of gas therethrough;
    means for introducing atmospheric air into a first of said baskets located upstream from a second of said baskets;
    means comprising spaced electrodes forming a spark gap located in the region between said first and second baskets;
    means producing intermittent sparks across said gap;
    said inlet being connected to the exhaust of an internal combustion engine having firing cylinder and piston means, and means causing a spark to jump across the gap each time a charge of fuel fires in a cylinder; and
    said engine having a carburetor for mixing air with a hydrocarbon fuel, and conduit means leading from a portion of the chamber of the first basket to conduct gaseous products from the last-mentioned position to an entry way into the carburetor.

2. A device according to claim 1 in which copper electrodes arranged to comprise a second spark gap are positioned at said entry way, and a source of alternating voltage means creating a spark at said second spark gap at the frequency of said source.

3. Method of reducing the quantity of pollutant mixed with the gaseous products of combustion of hydrocarbon fuel in an internal combustion engine which comprises:
    mixing the combustion products with atmospheric air, straining the mixture through an expandable basket comprising lengths of small cross-section copper wires placed closely together, offering variable porosity with respect to the passage of gas between the wires, and subjecting the strained mixture to intermittent sparks.

4. Method according to claim 3 in which a portion of the mixture subsequent to the straining is fed back to the entrance to the air intake of a carburetor of the engine and subjecting the feedback portion together with the air taken into the carburetor at the air intake, to intermittent sparks.

5. Method according to claim 3 in which heat developed by chemical reaction of the combustion products with the copper is reflected to the area where the reaction occurs.

6. Method according to claim 3 in which there is a second straining of the mixture following its being subjected to the intermittent sparks.

7. Method according to claim 3 in which the sparks are blue sparks.

* * * * *